United States Patent
Bonnick et al.

(10) Patent No.: US 6,428,677 B1
(45) Date of Patent: Aug. 6, 2002

(54) BROMIDE REMOVAL

(75) Inventors: David MacDonald Bonnick, Southfield; Roger Roydon Ford, Aitriaeham, both of (GB)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 08/973,078

(22) PCT Filed: May 4, 1995

(86) PCT No.: PCT/US95/05603

§ 371 (c)(1),
(2), (4) Date: Mar. 20, 1998

(87) PCT Pub. No.: WO96/34999

PCT Pub. Date: Nov. 7, 1996

(51) Int. Cl.⁷ .............................. C25B 1/26; C25B 9/00
(52) U.S. Cl. ...................... 205/500; 205/498; 205/499; 205/501; 205/536; 204/276
(58) Field of Search ............... 205/536, 500, 205/498, 499, 501; 204/276

(56) References Cited

U.S. PATENT DOCUMENTS

| | | |
|---|---|---|
| RE11,232 E * | 4/1892 | Dow |
| 3,909,377 A | 9/1975 | Bizot et al. |
| 3,917,518 A | 11/1975 | Franks et al. |
| 4,169,773 A * | 10/1979 | Lai et al. .................. 205/536 |
| 4,488,945 A * | 12/1984 | Spaziante .................. 205/500 |

FOREIGN PATENT DOCUMENTS

| | | |
|---|---|---|
| FR | 2388597 | 12/1978 |
| GB | 867790 | 4/1958 |
| GB | 867790 | 5/1961 |
| JP | 58-019603 | * 8/1984 |

OTHER PUBLICATIONS

N.N. Greenwood & A. Earnshaw, *Chemistry of the Elements*, Butterworth–Heinemann, publisher, second edition, pp. 855–856, 1997.

W. Stumm & J. J. Morgan, *Aquatic Chemistry: An Introduction Emphasizing Chemical Equilibria in Natural Waters*, John Wiley & Sons, publisher, second edition, pp. 444–445, 1981.

*The Merck Index*, S. Budavari, editor, Merck & Co., Inc., publisher, eleventh edition, p. 1363, cite No. 8577, 1989.

* cited by examiner

Primary Examiner—Arun S. Phasge
(74) *Attorney, Agent, or Firm*—Wolf, Greenfield & Sacks, PC

(57) ABSTRACT

A chlorination system in which brine is converted to sodium hypochlorite by an electrolyser. Brine (1) fed to the electrolyser (3) is passed through a filter (2) which is capable of adsorbing bromine or hypobromous acid. Some of the sodium hypochlorite produced in an electrolyser (3) is fed back to a point in the brine feed upstream of the filter (2) such that any bromide in the brine is oxidized to bromine or hypobromous acid and therefore adsorbed by the filter (2).

13 Claims, 1 Drawing Sheet

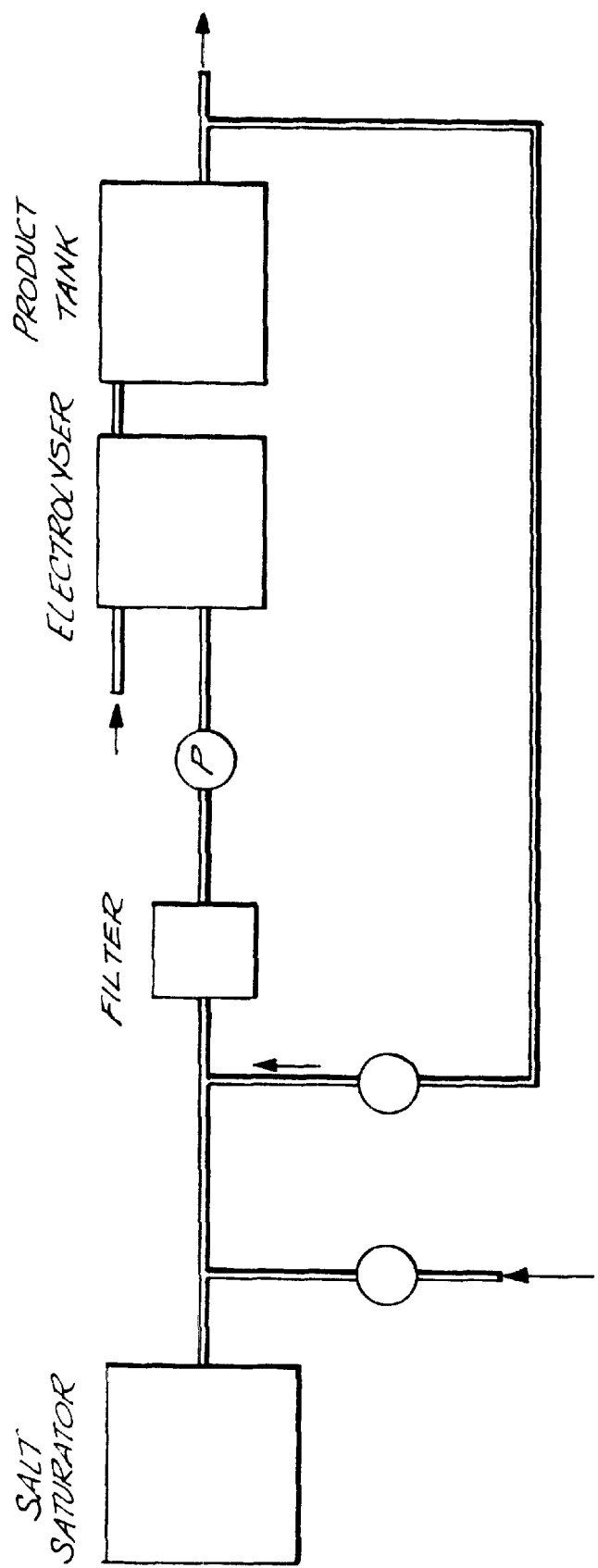

BROMIDE REMOVAL

BACKGROUND OF THE INVENTION

The present invention relates to a method and apparatus for removing bromide from an electrolytic chlorination system.

BACKGROUND OF RELATED ART

It is well known to produce sodium hypochlorite from sodium chloride brine by converting the brine to sodium hypochlorite in an electrolyser. Sodium hypochlorite is used to treat potable water. Unfortunately, if the brine includes traces of bromide, the electrolyser causes the conversion of the bromide by oxidation to bromate. It is desirable to produce bromate-free sodium hypochlorite for the treatment of potable water as experiments have indicated that bromate may be carcinogenic.

It is an object of the present invention to provide a method and apparatus for removing bromide from an electrolytic chlorination system so as to obviate or mitigate the problem outlined above.

SUMMARY OF THE INVENTION

According to the present invention, there is provided a method for removing bromide from an electrolytic chlorination system in which brine is converted to sodium hypochlorite in an electrolyser, wherein the brine is fed to the electrolyser through a filter containing a medium capable of adsorbing bromine or hypobromous acid, and sodium hypochlorite is fed back from the electrolyser and mixed with the brine feed upstream of the filter to oxidize any bromide in the brine to bromine or hypobromous acid.

The present invention also provides an electrolyser for converting brine to sodium hypochlorite, means for feeding brine to the electrolyser, a filter through which the brine is fed to the electrolyser, the filter being capable of adsorbing bromine or hypobromous acid, and means for mixing sodium hypochlorite from the electrolyser with the brine upstream of the filter such that bromide in the brine is oxidized to bromine or hypobromous acid. Preferably hydrochloric acid is mixed with the brine upstream of the filter to maintain a low pH and thereby ensure effective oxidation of the bromide.

BRIEF DESCRIPTION OF THE DRAWING

In the drawing:

FIG. 1 is a schematic illustration of a system according to the present invention.

DETAILED DESCRIPTION OF THE INVENTION

An embodiment of the present invention will now be described, by way of example, with reference to the accompanying drawing which illustrates a bromide removal system incorporated into a conventional on-site electrolytic chlorination system.

The illustrated electrolytic chlorination system comprises a salt saturator 1 in which brine is prepared. The saturator 1 may have a capacity of, for example, 15 cubic meters. Brine flows from the saturator 1 through a filter 2 to an electrolyser 3, the brine flow being maintained by a brine transfer pump 4. A flow rate through the pump 4 of 51.5 liters per hour may be established. The electrolyser 3 is of conventional form and is effective to oxidize the brine to sodium hypochlorite. The contents of the electrolyser are mixed with dilution water supplied through line 5 at a rate of 540 liters per hour, the resultant sodium hypochlorite being transferred to a product tank 6 with a capacity of 13 cubic meters.

With the exception of the filter 2, the components shown in the drawing and described above are entirely conventional. With the operation of such a conventional system, however, traces of bromide in the brine flow are converted to bromate and reach the product tank 6. This is undesirable as the content of the product tank 6 is delivered via line 7 to a treatment plant (not shown) in which the contents of the product's tank is mixed with a supply of potable water.

In accordance with the present invention, sodium hypochlorite from the product tank 6 is fed back through line 8 to a point upstream of the filter 2. The flow of hypochlorite is maintained by a hypochlorite transfer pump 9. Hydrochloric acid is also delivered to the brine flow upstream of the filter 2 via line 10, the flow of hydrochloric acid being maintained by a pump 11. In the illustrated system the flow of sodium hypochlorite was 1 liter per hour and the flow of hydrochloric acid was 1 liter per hour. The supply of hydrochloric acid is controlled to maintain a low pH in the brine flow upstream of the filter 2. Typically the acidity will be controlled to approximately 4 pH. At such a low pH, bromide in the brine flow is rapidly converted into bromine and hypobromous acid which is adsorbed by the filter 2. By appropriate selection of the stoichiometry and reaction time the further oxidization of the hypobromous acid to bromate can be minimized or substantially eliminated. Accordingly, providing the filter is capable of adsorbing bromine or bromine released by the reduction of hypobromous acid, substantially no bromine compounds reach the electrolyser and accordingly substantially no bromate reaches the product tank 8.

Appropriate materials for the filter 2 are activated carbon zeolites and insoluble reducing agents, for example calcium sulphite.

What is claimed is:

1. A method, comprising:
   providing a brine solution containing bromide;
   oxidizing the bromide in the brine solution
   filtering the brine solution through an adsorption medium to produce a substantially bromine-free solution; and
   passing the substantially bromine-free solution through an electrolyzer to produce bromate-free hypochlorite.

2. The method of claim 1, wherein the oxidation of the bromide produces bromine.

3. The method of claim 1, wherein the oxidation of the bromide produces hydrobromous acid.

4. The method of claim 1, wherein the bromide is oxidized using a source of hypochlorite.

5. The method of claim 4, wherein the source of hypochlorite is the bromate-free hypochlorite.

6. The method of claim 1, further comprising reducing the pH of the brine solution before oxidizing the bromide.

7. The method of claim 6, wherein the pH of the brine solution is reduced by adding hydrochloric acid.

8. The method of claim 1, wherein the adsorption medium is selected from the group consisting of activated carbon, zeolites and insoluble reducing agents.

9. A system, comprising:
   an inlet for receiving a brine solution containing bromide;
   a source of oxidizing agent fluidly connected to the inlet for oxidizing the bromide to produce bromine or hypobromous acid;
   a filter positioned downstream of the source of oxidizing agent, adapted to adsorb bromine or hypobromous acid;
   an electrolyzer positioned downstream of the filter, for producing hypochlorite from the filtered brine solution; and
   an outlet for discharging a bromate-free hypochlorite solution.

10. The system of claim 9, wherein the oxidizing agent includes hypochlorite.

11. The system of claim 10, wherein the source of hypochlorite is connected to the outlet.

12. The system of claim 9, further comprising a source of acid fluidly connected to the system upstream of the filter.

13. The system of claim 9, wherein the filter comprises a sorbing media selected from the group consisting of activated carbon, zeolites, and insoluble reducing agents.

* * * * *